United States Patent Office

3,796,634
Patented Mar. 12, 1974

---

3,796,634
INSOLUBILIZED BIOLOGICALLY ACTIVE ENZYMES
Royce Haynes and Kenneth A. Walsh, Seattle, Wash., assignors to the United States of America as represented by the Secretary, Department of Health, Education, and Welfare
Filed Mar. 19, 1970, Ser. No. 20,613
Int. Cl. C07g 7/02
U.S. Cl. 195—63   22 Claims

ABSTRACT OF THE DISCLOSURE

Described herein are methods, and products thereof, for the insolubilization of biologically active proteins such as enzymes, antibodies, and antigens with substantial retention of activity. Products of the invention assume the configuration of a monolayer of protein molecules enveloping a colloidal core of specific gravity greater than that of the protein itself. The monolayer is "stapled" against desorption and denaturation by reaction of molecules adsorbed on the denser colloidal cores with multifunctional crosslinking agents which form covalent linkages or bridges between adjacent protein molecules. The preferred colloidal cores are silica particles per se or surface-coated with a polyamine such as polyethyleneimine. Water soluble dialdehydes are preferred crosslinking agents for most proteins. The products of the invention are readily dispersed in their media of employment, yet can be quantitatively recovered by centrifugation. They are susceptible to diverse employments in food, pharmaceutical, detergent, and other industries.

---

The invention described herein was made in the course of work under a grant or award from the Department of Health, Education and Welfare.

FIELD OF THE INVENTION

This invention relates to the insolubilization of normally water soluble biologically active proteins with retention of biological activity.

BACKGROUND OF THE INVENTION

The diverse utilities of biologically active proteins have been widely recognized and commented upon in the literature. As an example, enzymes have been suggested for use and used in food, pharmaceutical, detergent, and other industries in employments which utilize their highly efficient catalytic and other properties. Among such uses can be mentioned the manufacture of synthetic penicillin, conversion of starches to simple sugars, chillproofing of beer, inversion of sucrose, desugaring of egg whites, clarification of fruit juices, modification of steroid structures, breakdown of cellulose into water soluble products, dehairing, meat tenderizing, conversion of pollutants to biodegradable forms, selective destruction of optical isomers in racemic mixtures, coagulation of milk in cheese manufacture, and degradation of macromolecules in laundry stains. Other biologically active proteins such as peptide hormones, antigenic proteins for immunoadsorption, and antibodies for selective removal of antigens have not been overlooked in the constant and promising effort to expand the useful purview of the nascent fields of biochemical and biomedical engineering.

A number of serious obstacles have presented themselves in the path to economic utilization of biologically active proteins. To begin with, free water soluble protein cannot be economically recovered from the environment in which it is employed. Once used, it is lost and must be replaced in a continuing operation. A recent commentator cites a "typical" price for pure enzyme which is greater by at least an order of magnitude than the free trade price of gold. When the cost of enzyme is once considered, the necessity that it be susceptible to more than "one-shot" employment becomes manifest. Another obstacle to the commercial utilization of biologically active protein has been the sensitivity of proteins to denaturation, i.e., loss of biological activity. The activity of protein molecules is largely a function of their three-dimensional conformation. When that conformation is subjected to alteration by, e.g., chemical attack or excesses of temperature or pH, the biological activity of the protein and hence its usefulness can be effectively extinguished.

In aid of overcoming the difficulties discussed above, it has been proposed to immobilize protein molecules by attachment to a lattice-type matrix such as cellulose, polystyrene, ethylene-maleic anhydride copolymers or "Sephadex" (a glucose polymer available from Pharmacia Fine Chemicals). The protein-containing lattice is then immersed in an environment containing the substrate to be acted upon, and can subsequently be removed to recover the bound protein. As used herein, "substrate" has reference to the molecules chemically acted upon by the bound protein—in the popular "lock and key" analogy, the substrate molecule is the key and the active site of the protein the lock.

The lattice-matrix approach has, while conferring some benefit, generated a whole new family of problems. Chief among those problems has been that, by the very nature of the lattice, access of the substrate to the bound protein, e.g., an enzyme, is restricted and substrate turnover (moles of substrate catalyzed per mole of enzyme per unit time) diminished. Such preparations exhibit efficiency markedly lower than the native enzyme, and the problem is particularly evident when large molecular weight substrates are employed. It will be appreciated, of course, that savings from enzyme recovery are in such cases diminished by inefficient employment of the enzymes themselves.

From the foregoing, it will be apparent that a need has existed for a method of enhancing the resistance of biologically active proteins to denaturation and of insolubilizing such proteins without seriously diminishing their efficiency in biochemical employments.

BRIEF SUMMARY OF THE INVENTION

According to this invention there is provided a method for insolubilizing normally water soluble biologically active proteins while retaining biological activity which comprises (a) adsorbing protein molecules in an aqueous medium as a monolayer on colloidal particles having a specific gravity greater than that of the protein and a net electric charge opposite to that of the protein at the pH at which adsorption and the subsequent crosslinking occurs; and (b) reacting the adsorbed protein molecules with a crosslinking agent having two or more groups reactive with side chains of amino acid residues to form stable covalent linkages between adjacent protein molecules.

In the product of the invention, insolubilized protein molecules envelop the colloidal adsorbant particle in a monolayer, and one object of the invention, i.e., that essentially all insolubilized protein molecules directly contact the surrounding medium, is attained thereby.

Another object of the invention is to provide insolubilized protein which resists denaturation.

Yet another object of the invention is to provide for the insolubilization of biologically active protein with substantial retention of biological activity.

A further object of the invention is to provide insoluble protein which by reason of its size and hydrophilic nature can be readily dispersed in substrate-containing media, yet which can be readily and quantitatively recovered by, e.g., centrifugation.

These and other objects and advantages of the invention will become apparent from the following detailed description thereof and from the accompanying drawings in which.

Figure 3:
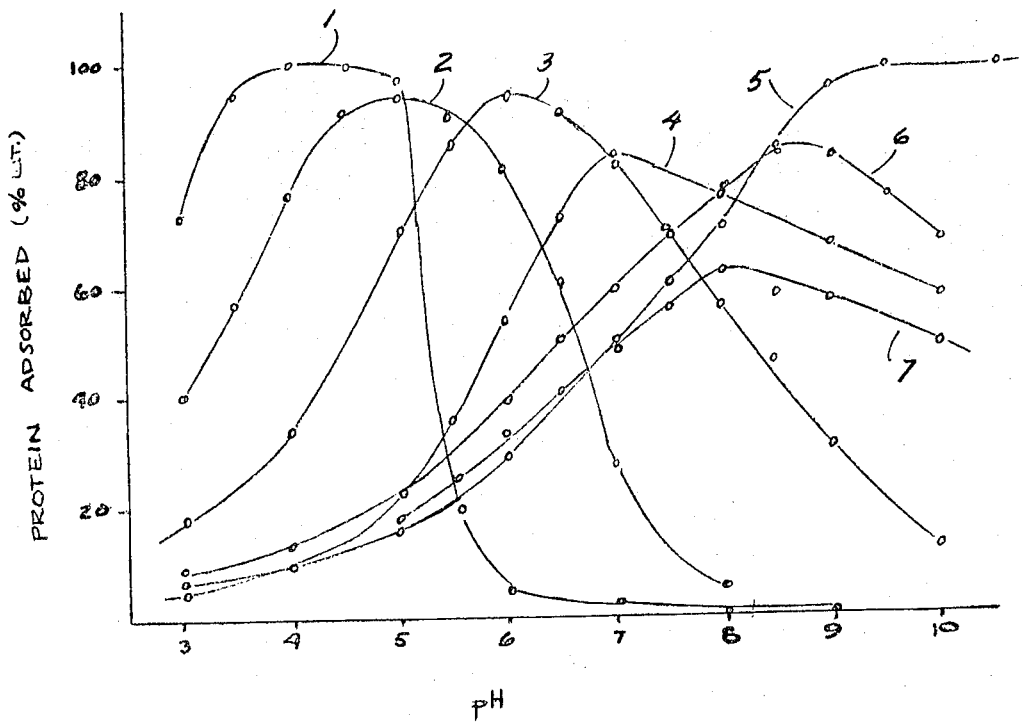

FIG. 3 graphically portrays the results of routine determinations of optimal pH for adsorption of typical biologically active proteins.

Figure 4:
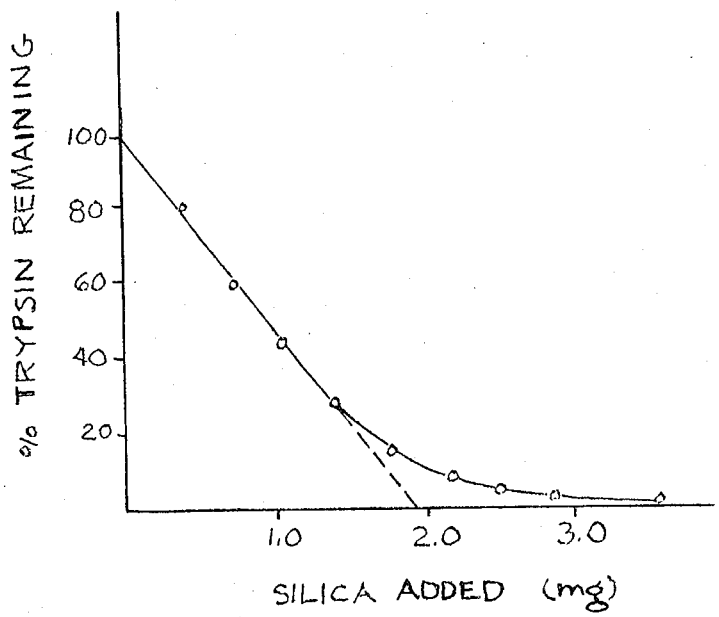

FIG. 4 graphically portrays the stoichiometry of adsorption of a typical protein on a preferred colloidal adsorbant.

Figure 5:
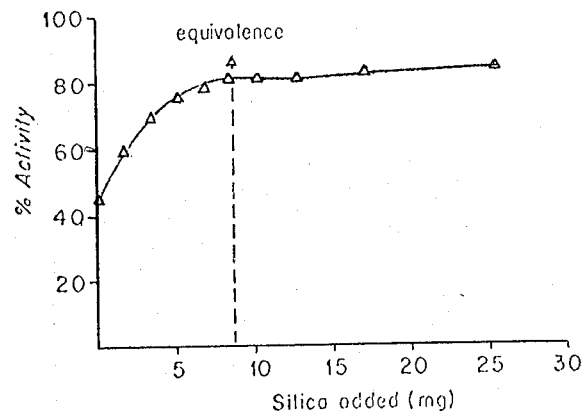
Figure 6:
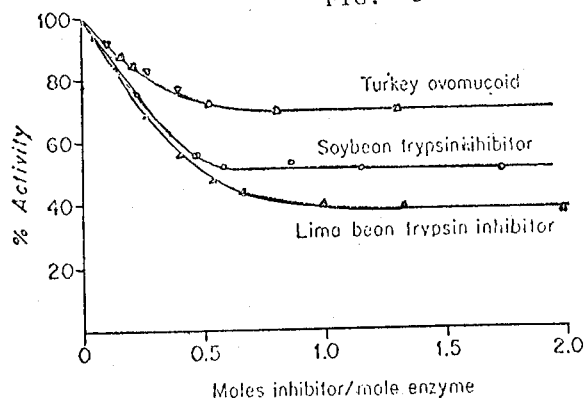

FIG. 5 graphically portrays the effect of colloidal adsorbant concentration on retained protein activity after crosslinking; and FIG. 6 graphically portrays percent retention of bound protein activity following inhibition with inhibitors of varying molecular weight.

DETAILED DESCRIPTION OF THE INVENTION

Figure 1:
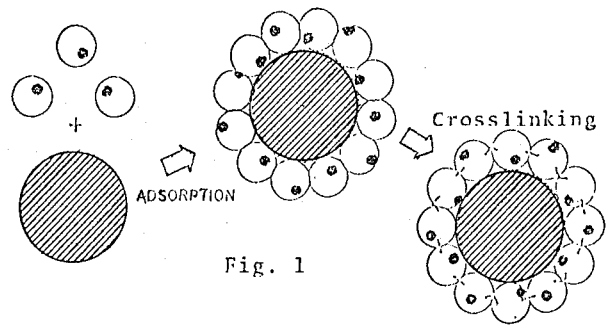
FIG. 1 depicts in partial cross-section the process of the invention.
Figure 2:
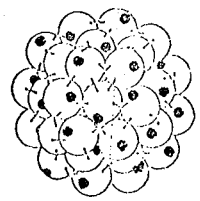
FIG. 2 is a pictorial view which schematically illustrates a product of the invention.

With reference first to FIG. 1, the process of the invention is schematically depicted as proceeding sequentially by the adsorption of protein molecules indicated as relatively small, light-colored spheres onto a colloidal adsorbant particles, followed by reaction with a multifunctional crosslinking agent to "staple" the adsorbed protein molecules about the adsorbant particle through formation of covalent linkages between adjacent molecules. As is apparent from the pictorial representation of FIG. 2, each protein molecule in the ultimate product is in direct contact with the surrounding medium (not shown). The active sites of the biologically active protein molecules, indicated schematically as black dots, are randomly oriented in the ultimate product. Nevertheless, many of them are presented to the exterior of the product and those distal to the outer surface have been shown to remain available to substrates penetrating the interstices between bound protein molecules. The covalent crosslinks between protein molecules appear to enhance resistance to denaturation by reducing the degrees of freedom enjoyed by individual molecules. For example, native trypsin is instantaneously deactivated in 8 M urea. Trypsin adsorbed on silica and crosslinked with glutaraldehyde according to this invention has retained 50% activity after 30 minutes in 8 M urea.

Any biologically active protein can be insolubilized by application of the instant invention. Preferably, the proteins have more than two exposed amino groups for participation in the crosslinking reaction, i.e., more than two epsilon amino groups of lysyl residues in the protein molecule. Of course, other groups borne by a particular protein molecule can be employed in cross-linking, notably sulfhydryl groups of cysteine amino acid residues and phenolic groups of tyrosine amino acid residues. Exemplary biologically active proteins which have been insolubilized according to the invention include bovine trypsin, bovine serum albumin, alpha-chymotrypsin, soybean trypsin inhibitor, hen's egg white lysozyme, bovine pancreatic ribonuclease, ovalbumin, and rabbit gamma G globulin. As exemplary of the wide range of proteins believed suitable for insolubilization according to the invention can be mentioned amylase, cellulase, dehydrogenase, depolymerase, glucoamylase, isomerase, lipases, pectinases, penicillin amidase, proteases such as bromelain and papain, pullulanase, phenylaline hydroxylase, homogentistic acid oxidase, L-aspariginase, and tyrosinase.

The colloidal particles onto which the biologically active proteins are adsorbed are chosen to exhibit specific gravity greater than that of the protein to be adsorbed so that protein recovery by centrifugation or the like is facilitated. Generally, then, the colloidal adsorbant exhibits specific gravity greater than about 1.3. The specific gravity of the preferred adsorbant, colloidal silica, is on the order of about 2.

The adsorbant particles employed are of colloidal dimensions such that the insolubilized protein can be readily dispersed in substrate-containing media, yet the protein "packages" can be easily recovered by centrifugation or the like by reason of their cores of relatively high specific gravity adsorbant. Generally, the adsorbant particles range in size from about 50 to about 20,000 angstroms, preferably from about 100 to 200 angstroms, and most preferably are about 150 angstroms in diameter. The particles are preferably chosen, in terms of size, from the smaller end of the foregoing broad range in order to maximize surface area per unit weight. In addition to colloidal silica, the preferred adsorbant, there can be mentioned as candidates for adsorbant use activated charcoal, hydroxyapatite, alumina C gamma, and bentonite. Preferably, as in the case of colloidal silica, the adsorbant particles employed are essentially non-reticulate so that access to bound protein is not restricted by the necessity that the substrate molecules penetrate the absorbant particle.

For the sake of protein adsorption, it is necessary that at the pH at which adsorption and crosslinking occur the colloidal adsorbant bear a net electric charge opposite that of the protein molecules so that ionic bonding aids other non-covalent bonding forces such as, e.g., hydrogen bonds. In particular instances the optimal pH for the crosslinking reaction may differ substantially from that at which adsorption is best effected on the adsorbant particle per se. Generally, protein molecules are negatively charged at pH greater than their isoelectric point (the pH at which the molecule is electrically neutral). Conversely, they are generally positively charged below their isoelectric point. Until crosslinking occurs to "staple" the protein envelope about the colloidal absorbant, the protein molecules are but weakly held by non-covalent bonds. Consequently, if the isoelectric point is interposed between optimal pH for crosslinking and optimal pH for adsorption onto the adsorbant per se, crossing the isoelectric point to crosslink can result in desorption of protein molecules by charge repulsion. As an example, it has been found that adsorption of ovalbumin on negatively charged colloidal silica drops off rapidly above pH of about 5. If it is desired to crosslink ovalbumin on silica with glutaraldehyde, the preferred crosslinking agent, the reaction must proceed at pH greater than about 5.5 and the ovalbumin desorbs at that pH.

By this invention, difficulties like the foregoing are obviated by appropriate surface treatment of the adsorbant particle per se, from whence springs the general applicability of the invention to all proteins regardless of isoelectric point. In the case of silica, problems arising in a particular instance are eliminated by adsorbing a surface coat of, e.g., polyethylenimine onto the silica surface prior to adsorption of protein. The polyamine coat is then crosslinked by reaction with conventional amine-reactive crosslinking agents. Subsequently, the negatively charged protein "sees" a positive surface on the adsorbant particle and can be readily adsorbed at a pH optimal for the protein-crosslinking reaction. Any macromolecular polyamine subject to crosslinking can be employed to alter the surface charge of the particle per se, e.g., polyethylenimine, polylysine, polyornithine, etc. In the light of the foregoing, of course, other manners of altering the net charge of adsorbant particles will occur to the art-skilled. In any case, the "colloidal particles" hereinafter referred to encompass both colloidal substances per se like colloidal silica, and colloidal particles of, e.g., silica bearing a polyamine surface coat or otherwise altered in charge properties to optimize protein retention during cross-linking.

The choice of crosslinking agent naturally depends upon the particular protein employed, inasmuch as that agent is selected to provide a plurality of available groups for reaction with exposed groups of amino acid residues to form covalent linkages. The great majority of proteins employed have sufficient amine functions for crosslinking purposes, so amine-reactive multifunctional crosslinking agents are generally to be employed. Among such agents can be mentioned dialdehydes such as glutarldehyde, malonaldehyde, succinaldehyde and adipaldehyle; diisocyanates such as m-xylylene diisocyanate, 2,2'-dicarboxy-4,4'-azophenyldiisocyanate, and tolylene-2,4-diisocyanate; difunctional alkyl halides such as 2,2'-dicarboxy-4,4'-azophenyldiisocyanate, and tolylene-2,4-diisocyanate; difunctional alkyl halides such as 2,2'-dicarboxy-4,4'-diiodoacetamidoazobenzene; alpha, alpha'-dibromo-p-xylenesulfonic acid, N,N-bis (beta-bromoethyl) benzylamine, N,N-di-(bromoacetyl) - phenylhydrazine and 1,2 - di (bromoacetyl) amino-3-phenylpropane; difunctional aryl halides such as p,p'-difluoro-m,m'-dinitrodiphenylsulfone and 1.5-difluoro-2,4-dinitrobenzene; difunctional imidoesters such as diethyl malonimidate and dimethyl adipimidate N-ethyl benzisooxazolium fluoborate; etc. Sulfhydryl groups of cysteine residues can participate in crosslinking with various agents, e.g., tris (1-(2-methyl)aziridinyl) phosphine oxide; the aforementioned alkyl and aryl halides and diisocyanates; and difunctional N - substituted malemide derivatives such as N,N'-(1,3-phenylene) bismaleimide, and N,N'-(1,2-phenylene) bismaleimide. Phenolic groups of tyrosyl residues have been reacted for crosslinking purposes with, e.g., various diazonium compounds and the literature is replete with additional examples of multi-functional crosslinking reagents for the above and other protein residues.

For the majority of proteins, the preferred crosslinking agent is a dialdehyde having from 1 to 10 carbon atoms, more preferably from 3 to 6 carbon atoms, and is most preferably glutaraldehyde. The crosslinking agent is preferably water soluble, and the dialdehydes may be, e.g., hydroxyl- or carboxyl-substituted to enhance their solubility in aqueous media. Water insoluble multifunctional crosslinking agents are reported in the literature as useful for protein crosslinking when added in acetone or in solid form to protein-containing aqueous media, but for simplicity in processing and purity in product it is preferred that water soluble crosslinking agents be employed in this invention. For the reasons stated, glutaraldehyde has been the agent principally employed in developing the methodology of this invention, and that compound is recommended for economic availability as well.

From the foregoing, it will be apparent that a wide variety of crosslinking agents are suitable for employment with the invention. Clearly, particular ones of them differ in the mechanism by which their plurality of reactive groups react with corresponding groups on amino acid residues. For example, glutaraldehyde appears to crosslink amino groups of lysyl residues by aldol condensation to form polymeric alpha, beta-unsaturated aldehydes. Malonaldehyde is believed to crosslink amino groups of lysyl residues by a process involving formation of a Schiff base intermediate. Whatever the case, characterization of crosslinking agents by groups "reactive" with side chains of amino acid residues is intended to encompass all agents so reactive, regardless whether or not they act through formation of transitory or other intermediates.

Where the crosslinking agent employed reacts with essential groups in the active site of the protein, care must be employed to prevent deactivation of those sites. To an extent, judicious control of crosslinking agent concentration and, more importantly, of the residence time of the agent can prevent complete deactivation. In exaggerated cases, the vulnerable active groups can be blocked—sulfhydryl groups, for example, can be blocked during crosslinking with mercuric ions, and the blocking ions subsequently removed with thiols, chelating agents or in other conventional fashions. The protein molecules are exposed in the course of the method of this invention to a variety of relative extremes, such as adsorption, agitation, and the imposition of other physical and chemical forces. Fortuitous denaturation and direct chemical modification of the active site can optionally be prevented by the employment of competitive inhibitors—substances which reversibly inactivate the protein by occupying the active site during processing. Benzamidine is commonly employed for this purpose with bovine trypsin, and the artskilled are well-acquainted with appropriate competitive inhibitors for various of the proteins with which the invention can be employed. Use of such inhibitors is especially desirable when proteolytic enzymes are to be insolubilized, so that the digestion of one protein molecule by another be avoided. Of course, once the protein molecules are "stapled" into place about the colloidal adsorbant, the opportunity of autolysis sharply declines and the inhibitor occupying the active site can be removed in conventional fashion.

The invention is further illustrated by reference to the following examples, in which all parts and percentages are by weight unless otherwise indicated.

With the exception of Example 1, which demonstrates the optimization of adsorption pH for a variety of enzymes, antibodies, and antigens, bovine trypsin has been employed throughout the examples as a useful model for demonstrating the manner in which optimal processing parameters are arrived at for water soluble proteins generally. Colloidal silica is employed throughout as the preferred adsorbant, and unless otherwise indicated is "Ludox HS" available from E. I. Du Pont de Nemours and Co. (diameter about 150 angstroms, sp. gr. about 2). In aid of avoiding competitive formation of soluble silicate complexes with protein, the silica was routinely dialyzed against water prior to use. Sodium borate is employed to buffer the various solutions. Sodium borohydride is added to reduce excess crosslinking agent so that in the following inhibition demonstrations no crosslinking occurs between protein and inhibitor and, in general, further reaction of available crosslinking groups is effectively precluded. The amount of crosslinking agent to provide maximum product stability with minimum in activation can be readily determined by the art-skilled. Generally an excess is employed and in the case of trypsin a five-fold excess of glutaraldehyde has been used. In commercial operation, of course, excess crosslinking agent can be removed by water wash or other conventional means. Desirably, sodium chloride or other electrolytic salts are added where indicated to aid in sedimentation of the bound protein. Thereby, the net charge of bound protein is altered so that charge repulsion is neutralized and aggregation promoted. Subsequently, of course, the bound protein can be redispersed and dialyzed by conventional techniques to remove salt.

Aqueous media is used throughout, and salt concentrations desirably held to no more than about 0.1 M to avoid aggregation. Of course, some proteins, e.g., globulin, require the presence of minor amounts of salt for solubilization and the occasional employment of those amounts is within the scope of the invention.

Protein concentration is the result of a balance struck between concentrations so low as to require work with excessive volumes of liquid, and concentrations so great as to create agglomeration problems. Preferably, concentration is about ½ mg. protein per milliliter of solution, and from a practical standpoint could generally range from about 0.05 mg./ml. to about 1 mg./ml. Of course, it is quite conceivable that in a particular instance the foregoing range could be extended in either direction, but no apparent purpose would be served thereby.

All determinations reported in the numbered examples were run at room temperature. Temperatures greater than about 50° C. should generally be avoided to lessen the danger of denaturation. Most proteins are stable down to about 0° C. and the exemplified operations can be run at less than room temperature if desired. Indeed, that is the recommended procedure for certain native proteins (e.g., lactic dehydrogenase) which are unstable in dilute solution (e.g., 0.1 mg./ml.) at room temperature.

In general, most operations are conducted under agitation to prevent agglomeration which may, in a given case, otherwise occur. Agitation employed is vigorous, but short of that which will cause foaming.

EXAMPLE 1

Optimal pH for adsorption of various proteins onto colloidal silica is determined. The results of the determinations are depicted graphically in FIG. 3 wherein 1 and 2 are for ovalbumin and bovine serum albumin respectively (antigens), 3 is for rabbit gamma G globulin (an antibody), and 4, 5, 6, and 7 are for alpha-chymotrypsin, hen's egg white lysozyme, bovine trypsin and bovine pancreatic ribonuclease, respectively (all enzymes).

To a 40 ml. solution of protein (½ mg./ml.) is added a two-fold weight excess of adsorbant silica (for runs 1 and 2, Du Pont "Ludox AM" aluminum-modified silica, 150 angstroms, sp. gr. about 2, was employed). As will appear from following examples, silica is added in less than the stoichiometric amount so that the solution is sensitive to changes in binding effectiveness. As pH is progressively raised, aliquots are withdrawn and bound protein sedimented therefrom by centrifugation at 30,000 g. The amount of protein adsorbed is determined subtractively by determining the amount of trypsin remaining in the supernatant (ultraviolet absorbance at 280 millimicrons). As before noted, the ovalbumin peak occurs at a pH too low for crosslinking with glutaraldehyde. That peak can be shifted right to, e.g., pH 6.5 if glutaraldehyde is to be employed, by resort to the polyamine pretreatment heretofore discussed. The high yields obtainable by employment of this invention are manifest from the results depicted in FIG. 3.

EXAMPLE 2

Taking pH of 8.5 as optimal for adsorption of bovine trypsin on colloidal silica, the stoichiometry of adsorption is next demonstrated. Various quantities of silica are added to 1.9 mg. bovine trypsin contained in a total volume of 3.0 ml. of aqueous solution containing 0.005 M sodium borate and 0.001 M benzamidine competitive inhibitor. pH is 8.5. The various solutions are mixed and held for about 15 min., then centrifuged at 20,000 g. for 20 min. The amount of trypsin remaining in supernatant is determined by ultraviolet absorption at 280 millimicrons and the results depicted in FIG. 4.

With reference to FIG. 4, it will be seen that initially, the added silica removes proportional quantities of protein from solution, but as more silica is added the curve deviates somewhat from linearity. The deviation apparently reflects perturbation of equilibrium or operation of binding constants promoting disassociation past the point of equilibrium. Taking the point of departure from linearity as representing equilibrium conditions, the stoichiometry of the initial adsorption is calculated. Taking surface area for the silica at 210–230 m.$^2$/g., molecular diameter of trypsin at 40 angstroms and assuming packing of trypsin as rigid spheres, it is calculated that trypsin occupies 77–85% of the surface area of the silica. The latter statistic, of course, supports the view that a monolayer of protein is formed.

Depending upon the particular protein employed, products prepared have exhibited silica/protein ratio ranging from about 1 to 2.5 on a weight to weight basis. Generally, a slight excess of protein over silica is employed to encourage formation of complete protein envelopes about the adsorbent particles. Use of large excesses of adsorbant is contra-indicated as encouraging formation of incomplete envelopes which can subsequently peel off under desorptive conditions (e.g., pH of 3 with bound trypsin).

EXAMPLE 3

This example demonstrates the relation of relative proportion of silica adsorbant to activity following crosslinking with glutaraldehyde. Various quantities of silica are added to 3.8 mg. trypsin in a total volume of 3.0 ml. aqueous solution containing 0.1 M sodium borate and 0.001 M benzamidine competitive inhibitor at a pH of 8.5. After mixing and holding for approximately 15 minutes, 25 microliters of 2.5% glutaraldehyde solution are added to each sample. After 60 minutes at room temperature, remaining estrolytic activity of the trypsin is measured, as judged by activity toward BAEE (0.01 M benzoyl arginine ethyl ester in 0.01 M tris-hydroxy methylamino methane buffer, 0.1 M KCl, pH 7.8, 26° C. in a pH stat.). The results of this run are set out in FIG. 5.

In the absence of silica there was a 55% loss in activity, associated with the formation of large aggregates of polymerized protein. Progressive increases in activity are observed as the silica concentration is increased until an equivalence point was reached. That equivalence point corresponds to the silica-trypsin ratio determined as the point at which the linear portion of the curve, when extrapolated, intersects the abscissa in trials like that depicted in FIG. 4. Above the equivalence point there is essentially no further increase in activity, again supporting the conclusion that maximum activity of the insolubilized enzyme is attained when the protein is bound as a monolayer.

EXAMPLE 4

This example demonstrates the very high retention of activity toward normal substrates enjoyed by the insolubilized protein of the invention by comparison to the native water soluble protein; and also establishes the retention of activity of active sites distal to the exterior of the bound protein by comparison with retained activity toward casein, a large substrate.

100 mg. lots of trypsin are rendered insoluble by treatment with a stoichiometric amount of silica (silica: trypsin ration 2.3:1 w./w., 15 min., room temperature) and 125 microliters of 25% glutaraldehyde for 1 hr. at room temperature. Both reactions were carried out in 50 ml. of 0.1 M borate, 0.001 M benzamidine, pH 8.5. The product, in this case, is then further treated with 0.05 M NaBH$_4$ for 20 minutes at 0° C. to reduce the remaining aldehydic groups and thus prevent covalent crosslinking to the protein inhibitors used in subsequent experiments. The recovery of insoluble trypsin after the glutaraldehyde reaction is greater than 99%, as judged by activity towards BAEE. However, losses in subsequent transfers reduce the overall yield to 80%. Enzymatic properties of a typical preparation are given in Table I.

TABLE I

|  | Moles active site [a]/mole protein | BAEE activity [b] molecules/ active site/ minute | Relative caseinolytic activity [c] per active site |
|---|---|---|---|
| Soluble trypsin | 0.74 | 1,700 | 100 |
| Insoluble trypsin | 0.60 | 1,500 | 17.5 |

[a] Active site titrations by the method of Chase, T. Jr., et al, Biochem. Biophys. Res. Commun. 29, 508 (1967), using p-nitrophenylguanidobenzoate. The insoluble enzyme was removed by centrifugation just prior to reading the absorbance.
[b] Per Example 3 procedure.
[c] Method of Laskowski, Sr., Methods in Enzymology 2, 26 (1955).

It should particularly be noted that BAEE turnover in the insolubilized trypsin is fully 88% of that obtaining in the native enzyme, so that the advantages of insolubilization are attained without undue loss of activity. The sharply decreased turnover of the large casein substrate when compared to the substantially retained turnover toward the smaller BAEE substrate is persuasive that active sites distal to the exterior of the protein "package" can yet be utilized by substrates which can penetrate the interstices between bound protein molecules.

EXAMPLE 5

To further demonstrate steric availability of active sites distal to the exterior of the bound protein "package," this example illustrates the extent to which bound trypsin can be inhibited by protein inhibitors of varying molecular weight—turkey ovomucoid (m.w. 28,000); soybean trypsin inhibitor (m.w. 21,000); and lima bean trypsin inhibitor (m.w. 9000).

Samples of silica-bound trypsin containing 1 mg. of active enzyme were mixed with increasing amounts of each inhibitor in a total volume of 1.0 ml. of 0.1 M tris-hydroxy methylaminomethane buffer 0.05 M. $CaCl_2$ at pH 7.8. After 15 minutes all samples were assayed with BAEE substrate for remaining esterolytic activity. The results are given in FIG. 6. It can be seen from this figure that the effectiveness of the inhibitor is inversely related to its size. In each case the percent inhibition reached a plateau indicating that only a limited number of sites were available to each inhibitor. The catalytic efficiency of sites not inhibited by soybean trypsin inhibitor, presumably those not directly on the surface of the particles, was then determined by active site titrations in parallel with activity determinations in the presence of the inhibitor. Within experimental error there was no difference in the turnover of BAEE by these "inner sites" when compared to the total available sites.

EXAMPLE 6

This example demonstrates macromolecular polyamine surface coating of colloidal silica to alter its surface charge from net negative to net positive.

3.56 ml. of 5% polyethyleneimine (PEI–18, m.w. 1800, Dow Chemical Co.) in water is added to 500 ml. aqueous solution 0.01 M in sodium borate contained in a Waring blendor jar. With the blendor going, 100 ml. of colloidal silica in water (2.13% silica) is added. After allowing 15 minutes for adsorption of the polyamine, 41.3 ml. of 2.5% glutaraldehyde in water is added slowly over 10 minutes with continued rapid blending. Blending is continued for 15 minutes, then 2 g. solid $NaBH_4$ added to reduce glutaraldehyde and reduction permitted to continue for 15 minutes. The contents of the blendor are then acidified with 5 ml. of 6 N HCl to eliminate excess $NaBH_4$ and centrifuged at 5000 r.p.m. (GSA rotor) for 10 minutes to harvest the surface coated silica. Sediment is washed three times with 0.01 MHCl, 0.05 M NaCl solution and resuspended for storage in 200 ml. aqueous solution 0.001 N in HCl. The treated silica is stored in acid media to prevent aggregation. When the treated colloidal particles are subsequently employed to adsorb protein at basic pH, the treated adsorbent is best added slowly with agitation and parallel addition of base to maintain pH. All that is important is that sufficient polyethylenimine be adsorbed on the colloidal silica to impart a net positive charge to the surface of the colloidal particles. When that amount has adsorbed, charge repulsion appears to ward off additional polyamine, so a believed excess of the polyamine can be employed for convenience in processing.

In addition to their role in demonstrating the structure of the invented insolubilized protein "package" and illustrating certain of the advantages of that package, the foregoing examples are presented as demonstrative of the techniques by which optimal operating parameters can be routinely arrived at for each of the diverse proteins, cross-linking agents and other materials with which the invention can be practiced.

From the above-detailed description it will be apparent that the product of the invention enjoys many advantages not comprehended in prior art approaches to enzyme insolubilization. By reason of their size, the protein "packages" can be easily dispersed, admitting of the preparation of readily measured homogeneous aliquots, and provide in every instance protein molecules which directly contact the dispersion medium. Even so, recovery can be quantitatively had by, e.g., centrifugation because of their cores of relatively high specific gravity. This is economically advantageous, and also highly important in the preparation of biochemical compounds where it is essential to remove all enzyme catalyst following reaction. The bound protein is stable under conditions where native enzyme is inactivated by denaturation—a property particularly useful in applications like hydrolytic enzymes in detergent compositions.

The products of the invention exhibit greater accessability to large interacting molecules than other known insoluble proteins, favoring their use as immuno-adsorbants in preparing specific antibodies, or in preparing insoluble antibodies as scavengers of homologous antigens. The invention provides an economical and rapid preparative method with high yield of insoluble product and good retention of enzymatic activity. The small sizes in which the invented product can be prepared suggest employment of the product to introduce insoluble protein into living cells to, e.g., supplement enzyme deficiencies. Enzymes insolubilized by the invention may serve as models for membrane bound systems, where electrostatic and diffusional effects are important. In short, the products of the instant invention are well-suited to a wide variety of employments which benefit from their novel and advantageous configuration.

We claim:

1. A biologically active insolubilized enzyme composition comprising normally water soluble biologically active enzymes adsorbed as a monolayer enveloping colloidal silica particles surface-coated with a macromolecular, crosslinked polyamine sufficient in thickness to impart net positive charge to the individual particles prior to enzyme adsorption thereon, said enzymes being crosslinked by reaction with a crosslinking agent having two or more groups reactive with side chains of amino acid residues of the enzymes to form stable covalent linkages between adjacent enzyme molecules, said colloidal silica particles ranging in diameter from about 50 to 20,000 angstroms prior to said surface-coating.

2. The composition of claim 1 wherein said enzymes are selected from the group consisting of protease, lipase, cellulase, amylase and pectinase enzymes.

3. The composition of claim 2 wherein the enzymes contained more than two epsilon amino groups of lysyl residues per enzyme molecule prior to crosslinking, and wherein the said reactive groups contained in the crosslinking agent are reactive with said amino groups to form said linkages.

4. The composition of claim 3 wherein said crosslinking agent is a water-soluble difunctional crosslinking agent.

5. The composition of claim 2 wherein said silica particles range in diameter from about 100 to 300 angstroms prior to surface-coating, and said polyamine is polyethyleneimine.

6. The composition of claim 5 wherein said polyethyleneimine is glutaraldehyde crosslinked.

7. The composition of claim 5 wherein said crosslinking agent is selected from the group consisting of aliphatic dialdehydes having from 1 to 10 carbon atoms.

8. The composition of claim 7 wherein said crosslinking agent has from 3 to 6 carbon atoms.

9. The composition of claim 7 wherein said crosslinking agent is glutaraldehyde.

10. The composition of claim 6 wherein said adsorbed enzyme molecules are crosslinked with glutaraldehyde.

11. A method for insolubilizing normally water soluble biologically active enzymes while retaining biological activity which comprises sequentially (a) adsorbing said enzymes in an aqueous medium as a monolayer enveloping colloidal silica particles surface-coated with a macromolecular cross-lined polyamine sufficient in thickness to impart a net electric charge to the individual particles opposite that of the enzymes at the pH at which adsorption and the crosslinking of step (b) occur, and (b) reacting the adsorbed enzymes with a crosslinking agent having two or more groups reactive with side chains of amino residues of the protein to form stable covalent linkages between adjacent enzyme molecules, said colloidal particles ranging in diameter from about 50 to about 20,000 angstroms prior to said surface-coating.

12. The method of claim 11 wherein said enzymes are selected from the group consisting of protease, lipase, cellulose, amylase and pectinase enzymes.

13. The method of claim 12 wherein said enzymes contained more than two epsilon amino groups of lysyl residues per enzyme molecule, and wherein the said reactive groups contained in the crosslinking agent are reactive with said amino groups to form said linkages.

14. The method of claim 13 wherein said crosslinking agent is a water-soluble difunctional crosslinking agent.

15. The method of claim 14 wherein the said enzyme exhibits net negative charge above its isoelectric point and is adsorbed onto said colloidal particles and crosslinked at a pH greater than the said isoelectric point.

16. The method of claim 15 wherein said polyamine is polyethyleneimine.

17. The method of claim 16 wherein said silica particles range in diameter from about 100 to about 300 angstroms prior to surface-coating, and said polyethyleneimine is glutaraldehyde crosslinked.

18. The method of claim 14 wherein said silica particles range in diameter from about 100 to about 300 angstroms.

19. The method of claim 18 wherein said crosslinking agent is selected from the group consisting of aliphatic dialdehydes having from 1 to 10 carbon atoms.

20. The method of claim 18 wherein said crosslinking agent is selected from the group consisting of aliphatic dialdehydes having from 3 to 6 carbon atoms.

21. The method of claim 18 wherein said crosslinking agent is glutaraldehyde.

22. The method of claim 17 wherein adsorbed enzyme molecules are crosslinked by reaction with glutaraldehyde.

References Cited

UNITED STATES PATENTS

| | | | |
|---|---|---|---|
| 3,556,945 | 1/1971 | Messing | 195—68 |
| 3,597,221 | 8/1971 | Ladenburg et al. | 39—48 |
| 3,705,084 | 12/1972 | Reynolds | 195—63 |
| 2,717,852 | 9/1955 | Stone | 195—Dig. 011 |
| 3,574,062 | 4/1971 | Sato | 195—63 |

OTHER REFERENCES

McLaren, A. D., The Adsorption and Reactions of Enzymes and Proteins on Kaolinite I, Journal of Physical Chemistry, vol. 58, 1954 (pp. 129–137) QDIJ9.

Goldman, L. et al., Papain-Collodion Membranes I, Preparation and Properties, Biochemistry, vol. 7, No. 2, 1968 (pp. 486–488) QD501B52.

Habeeb, A.F.S.A., "Preparation of Enzymically Active, Water-Insoluble Derivatives of Trypsin, Archives of Biochemistry and Biophysics, 119, 1967 (pp. 264–268) QD501A77.

DAVID NAFF, Primary Examiner

U.S. Cl. X.R.

195—68, Dig. 11; 260—112 R